Patented July 24, 1951

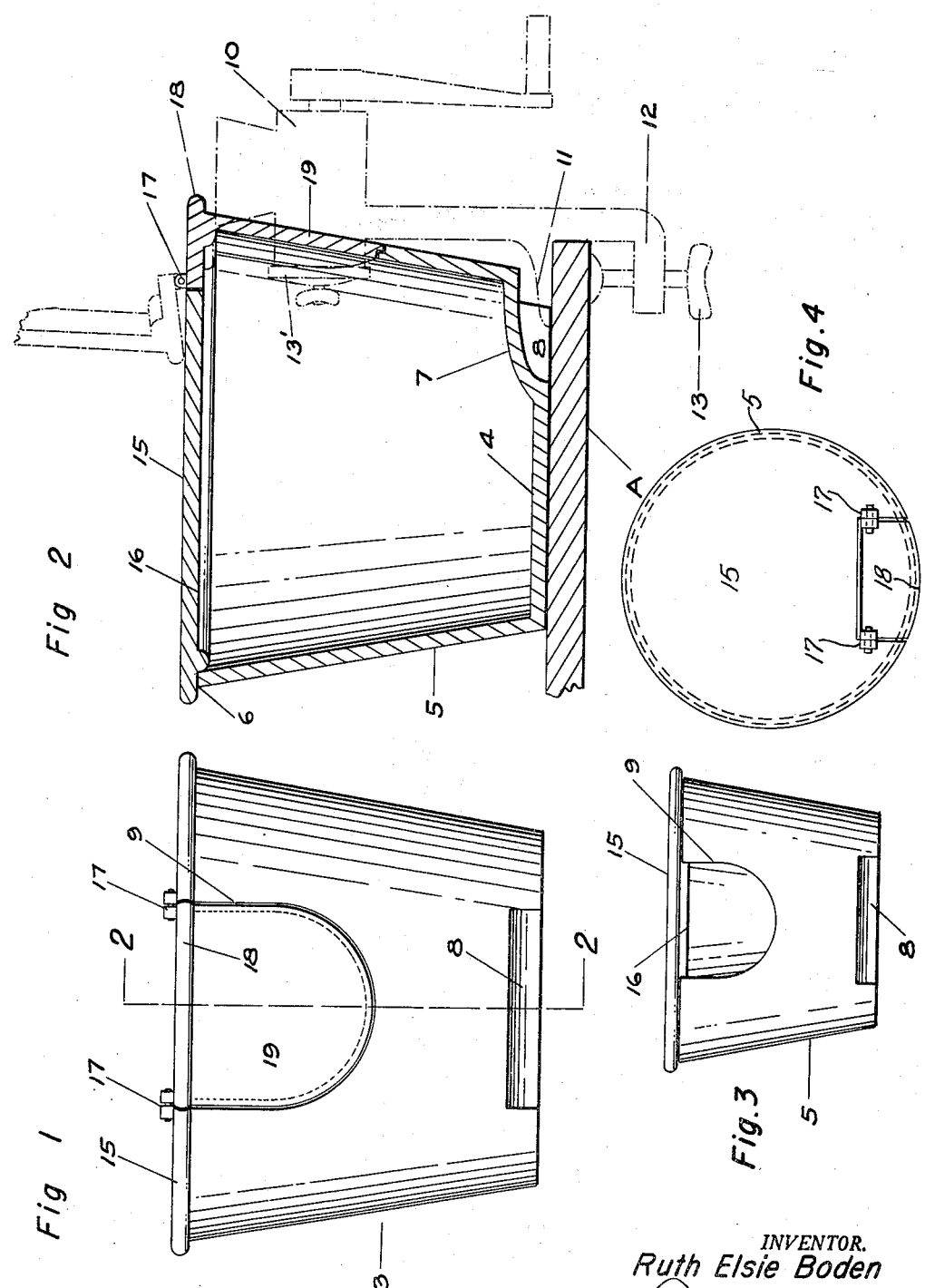

2,561,902

UNITED STATES PATENT OFFICE 2,561,902

COVERED DISH

Ruth Elsie Boden, San Mateo, Calif.

Application October 21, 1948, Serial No. 55,805

1 Claim. (Cl. 65—60)

This invention relates to improvements in kitchen utensils and has particular reference to the unique construction of a receptacle that is utilized to retain and receive therein ground or chopped food products, such as meat.

The principal object of the invention is to so construct the receptacle that it can be operatedly associated with a food grinder, to first eliminate wastage of the meat by directing it to the confines of the receptacle and, secondly, to provide a means in the receptacle for receiving portions of the food grinding member.

An additional object of the invention is the provision of a lid or cover, and a portion which is hinged to the lid and is capable of being raised to permit the insertion of the meat discharging portion or nose of the grinder into the receptacle, and to further function, when lowered, to protect the ground meat from spoilage or from foreign matter, when it is stored in a cooler.

An additional object of the invention is the provision of means formed in the receptacle to direct the flow of ground meat, discharged from the grinder, to the bottom of the receptacle.

An additional object of the invention is the production of an article of the character described that is most simple in construction, economical to manufacture, and highly serviceable and practical in use.

Other objects and advantages will be apparent during the course of the following description.

In the accompanying drawing wherein for the purpose of illustration is shown the preferred embodiment of my invention, Fig. 1 is a front elevational view of the preferred form of the invention, Fig. 2 is a transverse vertical section through the same, the view being taken on line 2—2 of Fig. 1, and the view likewise discloses to advantage the relationship of the food grinder to the receptacle, Fig. 3 is a front elevational view of a modified form of the invention, and Fig. 4 is a top plan view of the form of the invention illustrated in Fig. 1.

In the accompanying drawing the numeral 3 designates, as a whole, a hollow receptacle preferably constructed of plastic material that embodies in its construction a base 4, a tapered annular wall 5, and an upper open enlarged end 6. It will be noted that a portion of the bottom is curved upwardly as at 7 to provide an opening 8. The upper portion of the wall, directly above the opening, is cut out, as at 9, the purpose of which will be later explained. In the form of the invention shown in Fig. 2, the receptacle 3 is illustrated as positioned on a table or like support A. Secured to the end of the table A is a conventional food chopper 10 equipped with clamping arms 11 and 12 that serve to secure the chopper to the support A through the medium of an adjusting screw 13. The said chopper is likewise equipped with a nose or meat dispensing spout 13'. When the chopper is positioned relative to the receptacle, as disclosed to advantage in Fig. 2, it will be observed that the spout 13' enters the recess 9 and extends within the confines of the receptacle. Likewise, the arm 11 of the chopper is positioned in the recessed portion 8 of the receptacle.

It is to be noted that the upwardly curved portion 7 of the bottom 5 not only provides a recess for the reception therein of the arm 11, but the inclination of said portion 7 serves as a means for directing the passage or continuous flow of the meat to the top surface of the base 4.

The means for covering the receptacle comprises a lid 15 that is equipped with a bottom annular flange 16 that functions to prevent accidental displacement of the lid from the receptacle. Hingedly secured to the cover 15, as at 17, is a flat extension 18 having integrally formed therewith a downwardly extending or vertical panel 19 that functions to cover the recess 8, when the receptacle is stored in a cooler or like place. By virtue of this arrangement the food that has been emptied into the receptacle by the actuation of the chopper, is preserved from contact therewith of any foreign matter or extraneous air that would tend to spoil the stored meat. In Fig. 3 I have illustrated to advantage a modified form of the invention and in this form a solid cover 19 is employed. In this particular view the downwardly extending panel 19 that is integrally formed with the cover or lid 15, has been omitted, for the purpose of clarity, and to further show to advantage the U-shaped configuration of the recess.

In some instances where the grinder is equipped with a longer nose or discharge outlet, for the ground food, the recess 8 could be readily eliminated.

In the use of this form of the invention, wherein the receptacle is operatively associated with the food grinder, the cover is removed from the receptacle and the nose 13' of the grinder and the arm 11 thereof, respectively, enter the recess 8 and the cut out 9. However, when the receptacle is constructed in accordance with the form, illustrated in Fig. 2, it is unnecessary to remove the cover. The raising of the hinged panel, as illustrated in dotted lines, will permit the ready insertion of the nose into the receptacle.

From the foregoing description considered in connection with the accompanying drawing it will be obvious that I have devised a most unique receptacle wherein the objects of the invention will be readily accomplished.

It is to be understood that the forms of my invention herewith shown and described are to be taken as preferred examples of the same and that various changes relative to the material, size, shape and arrangement of parts may be resorted to without departing from the spirit of the invention or the scope of the subjoined.

Having thus described my invention, I claim:

A food receiving receptacle for use in connection with a food grinder, the latter being clamped to a support for the grinder and for said receptacle, said receptacle embodying in its construction a base and an annular wall, said wall having a cut out in the upper portion thereof adapted to receive the food discharge spout of the grinder, a portion of said base adjacent its point of connection with said wall, being curved upwardly to define an exterior recess for loosely fitting over one of the clamping arms that secures the grinder to the support, the upwardly curved portion adapted to direct the flow of ground meat from the grinder to the base of said receptacle, and a detachable lid for said receptacle embodying in its construction a hinged depending panel capable of being raised to uncover the recess that receives the nose of the grinder and adapted to be lowered to cover the recess of said receptacle.

RUTH ELSIE BODEN.

REFERENCES CITED

The following references are of record in the file of this patent:

UNITED STATES PATENTS

| Number | Name | Date |
|---|---|---|
| 498,455 | Bartlett | May 30, 1893 |
| 793,843 | Libbman | July 4, 1905 |
| 1,085,572 | Toepperwein | Jan. 27, 1914 |
| 1,242,785 | Eldridge | Oct. 9, 1917 |
| 1,331,862 | Claus | Feb. 24, 1920 |
| 1,347,419 | Swenson | July 20, 1920 |
| 1,989,574 | Van Roosendael | Jan. 29, 1935 |
| 2,049,579 | Whiteley | Aug. 4, 1936 |
| 2,130,397 | Niedheimer | Sept. 20, 1938 |